United States Patent Office 3,415,849
Patented Dec. 10, 1968

3,415,849
CATALYTIC OXIDATION OF NITROSOPHENOLS
TO BENZOQUINONES
Calvin J. Worrel, Detroit, Mich., assignor to Ethyl Corporation, New York, N.Y., a corporation of Virginia
No Drawing. Filed Sept. 24, 1964, Ser. No. 399,076
11 Claims. (Cl. 260—396)

ABSTRACT OF THE DISCLOSURE

Nitrosophenols in the presence of oxygen are catalytically oxidized to benzoquinones. For example, 2,6-di-tert-butyl-4-nitrosophenol is converted to 2,6-di-tert-butyl-p-benzoquinone by contacting oxygen in the presence of a catalytic metal compound. The benzoquinones are readily reduced to hydroquinones.

---

This invention relates to a process for producing benzoquinones. This invention further relates to a novel process for producing benzoquinones by the oxidation of nitrosophenols. In particular, this invention relates to a process for producing benzoquinones by the catalytic oxidation of nitrosophenols, and to a process for producing hydroquinones by the catalytic oxidation of nitrosophenols followed by the reduction of the benzoquinones thereby produced.

The benzoquinones and hydroquinones produced by this process are reactive chemical intermediates and have the many utilities known for this type of compound. The benzoquinones produced by this process, for example, are easily reduced to hydroquinones and can, therefore, function in organic reactions as oxidizing agents. The hydroquinones produced by the process of this invention are useful as antioxidants in organic media, such as gasoline, plastics, rubber, and the like. The hydroquinones can also be used as reducing agents in chemical reactions. Furthermore, the hydroquinones can be converted to other useful compounds such as antioxidants. For example, 2-tert-butyl-hydroquinone is readily methylated by dimethylsulfate to yield 2-tert-butyl-4-methoxyphenol, a valuable food antioxidant.

In the past, the use of these compound has been curtailed by their general unavailability and high cost of preparation. This is particularly true of 2,6-di-alkyl-benzoquinones and hydroquinones. The preparation of these compounds has been accomplished only by involved and indirect routes requiring expensive reagents and starting materials.

One of the most formidable problems involved in the preparation of 2,6-di-alkyl-para-benzoquinone is that the oxidation routes known in the art lead to extensive by-product formation. Thus, for example, in the prior art methods, the oxidation of 2,6-di-tert-butylphenol leads primarily to 3,3′,5,5′ tetra-tert-butyl-diphenoquinone. Furthermore, the prior art methods for the oxidation of such commercial compounds as 2,6-di-tert-butyl-4-methylphenol (known in the trade as "Ionol") leads to the formation of extensive amounts of products such as 3,5-di-tert-butyl-para-hydroxybenzaldehyde, 1,2-bis(3,5-di-tert-butyl-4-hydroxyphenol)ethane, and 3,3′,5,5′-tetra-tert-butylstilbene-4,4′-benzoquinone, (M. S. Kharasch et al., J. Org. Chem., 22, 1439–43 (1957)).

Some of the prior art methods of preparing benzoquinones or hydroquinones are based upon the reaction of alkali metal hydroxides with halophenols at high temperatures. Unfortunately, these processes are not readily applicable to complex phenols and in particular, they are not readily applicable to 2,6-dialkylated phenols because the elevated temperatures required lead to extensive rearrangement and decomposition.

There exists, therefore, a need for a process capable of oxidizing complex phenols to benzoquinones in high yields without extensive contamination with decomposition products. This invention satisfies that need.

An object of this invention is to provide a novel method for the preparation of benzoquinones. Another object is to provide a process for the preparation of para-benzoquinones. A further object is to provide a process for the preparation of alpha-branched ortho alkylated para-benzoquinones. A particular object of this invention is to provide a process ideally suited for the preparation of 2,6-di-tert-butyl-para-benzoquinone. Other objects will be apparent from the following detailed description and appended claims.

The objects of this invention are accomplished by providing a process for producing a benzoquinone which comprises reacting a nitrosophenol with oxygen in contact with an oxidation catalyst. A preferred embodiment of the present invention is a process which comprises reacting a para-nitrosophenol with oxygen in contact with an oxidation catalyst. A more preferred embodiment of this invention is a process which comprises reacting a para-nitrosophenol with oxygen in contact with an oxidation catalyst, said para-nitrosophenol being substituted in at least one ortho position with an alpha-branched alkyl group containing 3 to 12 carbon atoms. A most preferred embodiment of this invention is a process for preparing 2,6-di-tert-butyl-benzoquinone which comprises contacting 2,6-di-tert-butyl-4-nitrosophenol with oxygen in the presence of an oxidation catalyst.

Nitrosophenols suitable for use in this process are phenolic compounds wherein a nitroso radical is bonded to a carbon atom in the benzene ring containing the phenolic hydroxyl group. Current theory teaches that nitrosophenols exist as an equilibrium mixture of a nitrosophenol and an oxime.

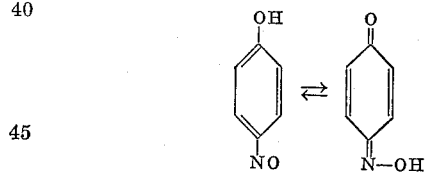

This invention is independent of the state or equilibrium in which the particular nitrosophenol might exist and operates as well on the equilibrium mixture of nitrosophenol and oxime as it does on the pure nitrosophenol.

Although the present invention is operable on nitrosophenols containing a fused benzene ring system, it is particularly adapted to the conversion of mononuclear nitrosophenols to the corresponding benzoquinone. The preferred nitrosophenols used in this invention are, therefore, mononuclear nitrosophenols; that is, the hydroxyl radical and the nitroso radical are bonded to an isolated benzene ring.

The present invention is operable on either ortho- or para-nitrosophenols. When ortho-nitrosophenols are subject to the process of this invention, the resultant benzoquinone is an ortho-benzoquinone. Similarly, when para-nitrosophenols are subject to the process of this invention, the resultant product is a para-benzoquinone. The more preferred nitrosophenols of this invention are para-nitrosophenols. In general, the para-benzoquinones produced from them have been found to have greater utility.

Highly preferred nitrosophenols of this invention are mononuclear para-nitrosophenols in which at least one position ortho to the phenolic hydroxyl radical is substituted with an alpha-branched alkyl or aralkyl group. Such nitrosophenols have the formula:

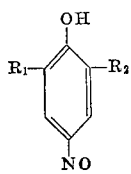

wherein $R_1$ and $R_2$ are the same or different radicals and are selected from the group consisting of hydrogen, secondary or tertiary alkyl radicals containing 3 to 12 carbon atoms, cycloalkyl radicals containing 3 to 12 carbon atoms, or aralkyl radicals containing 3 to 12 carbon atoms, such that not over one of the radicals is hydrogen. Such radicals, other than hydrogen, are frequently referred to as alpha-branched radicals in that the carbon atom in the position adjacent to the benzene ring has a side chain branch containing at least one carbon atom. Examples of such radicals are isopropyl, sec-butyl, tert-butyl, sec-amyl, sec-isoamyl, tert-amyl, sec-hexyls, tert-hexyls, sec-dodecyls, tert-dodecyls, cyclopropyl, cyclopentyl, cyclohexyl, α-methylbenzyl, α,α-dimethylbenzyl, 4-isopropyl-α,α-dimethylbenzyl, and the like. In the most preferred nitrosophenol of this invention $R_1$ and $R_2$ are both tert-butyl groups, resulting in the compound 2,6-di-tert-butyl-4-nitrosophenol. It is with nitrosophenols such as this, wherein many prior art processes cause decomposition or rearrangement of the alkyl substituent, that the present invention is most useful.

The nitrosophenols used in this invention may be prepared by any of the several methods already known in the art. For example, nitrosyl chloride reacts readily with phenolic compounds having an open para position to yield para-nitrosophenols (Moyer, U.S. 2,074,127, March 1937). The procedure most frequently used is the reaction of nitrous acid with phenolic compounds having an unsubstituted ortho or para position. A facile method of effecting this reaction is to dissolve the phenolic compound in a suitable solvent, such as an alcohol, and add thereto a stoichiometric quantity of sodium nitrite. Following this, an aqueous solution of sulphuric acid is gradually added to convert the sodium nitrite to nitrous acid, which nitrosates the phenol. Preferably, the temperature is maintained between 0 and 10° C. during this addition. The nitrosophenol produced in this manner is usually insoluble in the reaction medium and precipitates therefrom.

The process of this invention is equally operable on ortho-nitrosophenols. Ortho-nitrosophenols can be prepared in a manner similar to that described above for para-nitrosophenols with the exception that the phenolic starting material must have an open ortho position and the reaction mass must also contain copper sulfate. This procedure is described by Cronheim, J. Orig. Chem., I, 7, (1947).

Oxidation catalysts suitable for use in this invention are any of those known in the art to catalyze the oxidation of organic material. The more preferred oxidation catalysts are metals or metal cations. Still more preferred oxidation catalysts are metals or metal cations of the first, second and third transitional series of the Periodic Table. The most preferred oxidation catalysts are copper, cobalt, molybdenum, nickel, cerium, manganese, iron, vanadium, chromium, platinum and palladium.

Although the catalytic metal may be present in its elemental form, it is usually present in the form of its oxide or inorganic or organic acid salt. Examples of metal oxides include cupric oxide, cuprous oxide, cobaltous oxide, cobaltic oxide, molybdenum sesquioxide, molybdenum dioxide, molybdenum trioxide, nickel oxide, nickel sesquioxide, ceric oxide, cerous oxide, manganous oxide, manganous-ic oxide, manganic oxide, manganese dioxide, ferric oxide, ferrous, oxide, magnetite, vanadium dioxide, vanadium tetraoxide, vanadium pentaoxide, chromous oxide, chromium dioxide, chromic oxide, platinum(ous) oxide, platinum(ic) oxide, platinum(ous-ic) oxide, palladium suboxide, palladium monooxide and palladium dioxide.

The preferred inorganic acid anions incorporated in the metal salt form of the oxidation catalysts of this invention are those derived from the readily available inexpensive inorganic acids. Examples of such acids are hydrochloric, sulphuric, phosphoric and nitric. Some examples of preferred metal salts of inorganic acids include cuprous chloride, cupric chloride, cuprous sulfate, cupric sulfate, cupric nitrate, cuprous phosphate, cupric phosphate, cobaltous chloride, cobaltic chloride, cobaltous sulfate, cobaltic sulfate, cobaltous nitrate, cobaltic nitrate, cobaltous phosphate, cobaltic phosphate, molybdenum chloride, molybdenum sulfate, molybdenum nitrate, molybdenum phosphate, nickel chloride, nickel sulfate, nickel nitrate, nickel phosphate, cerium chloride, cerium sulfate, cerium nitrate, cerium phosphate, manganese chloride, manganese sulfate, manganese nitrate, manganese phosphate, ferric chloride, ferrous chloride, ferric sulfate, vanadium chloride, chromium chloride, chromium nitrate, platinum chloride, platinum nitrate, palladium chloride, and palladium nitrate.

Other preferred metal salts used as oxidation catalysts in this invention are those derived from organic acids. The preferred organic acids include both mono and poly basic acids containing from 1 to about 20 carbon atoms. Some examples of these acids include carbonic, formic, acetic, glycolic, propiolic, citric, glutaric, malonic, succinic, sebacic, oleic, stearic, lauric, linoleic, palmitoleic, caproic, caprylic, benzoic, alkylated benzoic, Talloil acids, and petroleum derived naphthenic acids. Examples of organic acid salts useful as oxidation catalysts in this invention include copper carbonate, copper formate, cobaltic acetate, nickel acetate, molybdenum stearate, copper naphthenate, molybdenum naphthenate, nickel naphthenate, cerium acetate, cerium laurate, cerium citrate, manganese propionate, manganese naphthenate, manganese salts of Talloil acids, iron naphthenate, vanadium glycolate, chromium stearate, and the like.

The activity of the oxidation catalysts used in this invention is frequently enhanced by the formation of an amine complex with the oxidation catalyst. Amines used to form such complexes include pyridine, tetramethylethylenediamine, phenylenediamine, diethylamine, n-butylamine, and the like. Examples of amine complexes include cuprous chloride-pyridine complex, cuprous chloride-tetramethylethylenediamine complex, nickel chloride-phenylenediamine complex, cobaltous chloride-pyridine complex, molybdenum chloride-tetramethylethylenediamine complex, manganese sulfate-phenylenediamine complex, and the like.

A method frequently employed to solubilize the metal oxidation catalysts is to introduce them in the form of chelates. Examples of chelating agents frequently used are ethylenediaminetetraacetic acid, ethylacetoacetate, and the like.

The oxidation catalysts employed in this process are present in quantities sufficient to catalyze the oxidation of the nitrosophenol. Although more or less catalyst can be used, the oxdiation usually proceeds readily when the concentration of oxidation catalyst is from 1 to about 20 mole percent of the nitrosophenol being oxidized. A more preferred catalyst concentration is from about 2 to about 10 mole percent of the nitrosophenol being oxidized, and a most preferred concentration of oxidation catalyst is from about 5 to about 10 mole percent of the nitrosophenol being oxidized.

Although the present process may be conducted without a solvent, it is usually preferred to use a suitable liquid reaction media. Preferred liquid reaction media are those capable of dissolving at least a portion of the catalyst and nitrosophenol and which are substantially inert under the conditions of the reaction. Preferred solvents include aliphatic and aromatic hydrocarbons, liquid organic acids and anhydrides, ketones, chlorinated hydrocarbons, esters and ethers.

Some examples of suitable aliphatic hydrocarbons include hexane, heptane, isooctane, mixed octanes, nonanes, petroleum derived aliphatic hydrocarbon distillation fractions, and the like.

Aromatic hydrocarbons suitable for use in the present process include those that are liquid under the reaction conditions and which are not themselves oxidized during the process. Examples of aromatic hydrocarbons useful in this process include benzene, toluene, xylene, mixed aromatic hydrocarbon distillation fractions, and the like.

Organic acids and acid anhydrides useful in this process include those that are liquid under the reaction conditions and which are not themselves oxidized. The preferred organic acids and anhydrides used in this process are the simple mono basic organic acids and anhydrides. Examples of such acids and anhydrides include acetic acid, acetic anhydride, propionic acid, propionic anhydride, butyric acid, butyric anhydride, and the like.

Ketones can be employed as solvents in this process. Preferred ketones include acetone, methylethylketone, diethylketone, ethylbutylketone, dibutylketone, and the like.

Chlorinated aliphatic or aromatic hydrocarbons can be used in the practice of this invention. Examples of some preferred chlorinated aliphatic hydrocarbons include methylene chloride, chloroform, carbon tetrachloride, 1,1,2-trichloroethane, perchloroethane, 1,2-dichlorohexane, and the like. Some preferred chlorinated aromatic hydrocarbons include 1,2,4-trichlorobenzene, chlorobenzene, 1,2-dichlorobenzene, and the like.

Another class of solvents useful in this process are esters. The preferred esters used in this process are the simple esters formed from the reaction of a simple mono hydroxy alcohol containing from about 1 to about 15 carbon atoms, and a mono basic carboxylic acid containing from about 1 to about 20 carbon atoms. Some examples of such esters include ethylacetate, hexylformate, amylacetate, octylacetate, tridecylvalerate, pentadecylbutyrate, amylstearate, ethyllaurate, and the like.

The preferred ethers used in this process include those containing one, or more than one, ether linkage. Examples of suitable ethers include dibutylether, ethyleneglycoldiethylether, diethyleneglycoldimethylether, triethyleneglycoldimethylether, diethyleneglycoldiethylether, diethyleneglycoldibutylether, ethyleneglycoldibutylether, and the like.

Another class of suitable solvents related to both ethers and alcohols are those compounds having both an ether linkage and a hydroxyl group in the same molecule. This class of compounds may contain one or several ether and hydroxyl groups. Some examples of such compounds include diethyleneglycol, monomethylethyleneglycol, monomethyldiethyleneglycol, monoethyltriethyleneglycol, and the like.

The solvent employed may be a pure compound or it may be a mixture of different compounds. Examples of such mixtures are toluene and carbon tetrachloride, kerosene, dimethylethyleneglycol and toluene, toluene and octane, 1,2,4-trichlorobenzene and kerosene, carbon tetrachloride and isooctane, and the like.

The most preferred solvents are acetic acid, acetic anhydride and toluene, because of their low cost and excellent results obtained when they are used.

The reaction should be carried out at a temperature high enough to promote the oxidation of the nitrosophenol, but not so high as to cause degradation of the reactants, reaction medium or products. A preferred temperature range is from about 75 to about 200° C. A more preferred temperature range is from about 100–150° C. A most preferred temperature range is from about 100–120° C., because in the vast majority of cases this temperature range will promote rapid conversion of the nitrosophenol to the benzoquinone in high yield.

The oxygen reacted with the nitrosophenol in this process may be in the form of pure oxygen or in a dilute form such as air. Because of its ready availability and low cost, air is a preferred source of oxygen.

The process of this invention may be conducted at atmospheric pressure or pressures below or above atmospheric. When pure oxygen is used in the reaction, less pressure is usually required than when a dilute form of oxygen, such as air, is used in the process. When pure oxygen is used a preferred range is from atmospheric pressure to about 300 p.s.i.g. A more preferred pressure range is from about 100–250 p.s.i.g. A most preferred pressure range is from 175–225 p.s.i.g. In this pressure range the reaction proceeds rapidly, yielding the desired benzoquinone in high yield. When air is usd as the source of oxygen a preferred range is from atmospheric pressure to about 1000 p.s.i.g. A more preferred pressure range is from about 150–300 p.s.i.g., and a most preferred pressure range is from about 200–250 p.s.i.g. When operating in this most preferred pressure range with air, results are obtained which are about equivalent to those obtained using pure oxygen.

The oxidation of nitrosophenols proceeds at a higher rate when an activator is present. Examples of activators are methylethylketone, acetone, cyclohexanone, benzoyl peroxide, azobisisobutyronitrile, and the like. When activators are used in the process of this invention they are usually present in about the same molar concentration as the oxidation catalyst.

The reaction time required to convert various nitrosophenols to benzoquinones using this invention will vary according to the process conditions employed and the particular nitrosophenol used as a starting material. In general, higher temperatures will promote faster conversions. In addition, higher oxygen pressures usually lead to faster reaction rates. In most instances, the reactions are essentially complete in one to twelve hours. A more preferred reaction time is from two to about eight hours. A most preferred reaction time is from four to eight hours. Reaction times in this range under a great variety of process conditions usually lead to maximum yields of the desired benzoquinone.

The following examples illustrate the method of conducting the benzoquinone process of this invention. All parts are parts by weight unless otherwise specified.

EXAMPLE I

Into a stainless steel pressure reaction vessel, equipped with a thermocouple, pressure gauge and agitation means, was charged:

| | Parts |
|---|---|
| 2,6-di-tert-butyl-para-nitrosophenol | 5.88 |
| Cobaltous acetate tetrahydrate | 0.62 |
| Methyl ethyl ketone | 0.18 |
| Acetic acid | 52.5 |

The pressure vessel was sealed, and while agitating the reaction mixture, the pressure in the vessel was raised to 200 p.s.i.g. with oxygen. The vessel was heated to 150° C. and maintained at this temperature for a period of five hours, during which time the pressure decreased to 150 p.s.i.g. The vessel was then cooled and vented. The contents of the autoclave were discharged into a suitable vessel containing 300 parts of water and the resultant mixture was then steam distilled. A bright orange product, which was identified by its melting point of 65–68° C. as 2,6-di-tert-butyl-para-benzoquinone, was obtained.

When other nitrosophenols are employed in the above example equally good results are obtained. For example, when para-nitrosophenol is used in place of 2,6-di-tert-butyl-para-nitrosophenol, para-benzoquinone is obtained in good yield. When 2-isopropyl-4-nitrosophenol is used, o-isopropyl-para-benzoquinone is obtained in good yield. When 2,6-di-isopropyl-4-nitrosophenol is employed, 2,6-di-isopropyl-para-benzoquinone is obtained. When 2-chloro-4-nitrosophenol is used in the above example, 2-chloro-para-benzoquinone is obtained in excellent yield. When 2,6-dichloro-4-nitrosophenol is employed, 2,6-dichloro-para-benzoquinone is obtained. The use of 2-sec-butyl-4-nitrosophenol results in the formation of 2-sec-butyl-para-benzoquinone. The use of 2,6-di-sec-butyl-4-nitrosophenol leads to the formation of 2,6-di-sec-butyl-para-benzoquinone. Likewise, the use of 2-(α-methylbenzyl)-4-nitrosophenol yields 2-(α-methylbenzyl)-para-benzoquinone. When 2,6-di-(α-methylbenzyl)-4-nitrosophenol is employed, 2,6-di-(α-methylbenzyl)-para-benzoquinone is obtained in good yield.

EXAMPLE II

To a stainless steel pressure vessel of the type described in Example I was charged:

| | Parts |
|---|---|
| 2,6-di-tert-butyl-4-nitrosophenol | 5.88 |
| Cobaltous active tetrahydrate | 0.62 |
| Cyclohexanone | 0.25 |
| Acetic acid | 52.5 |

The vessel was then sealed and heated to 104° C. It was then pressurized with oxygen to an initial pressure of 200 p.s.i.g. The vessel was maintained at 100–110° C. for one hour, and then cooled to room temperature and the residual pressure vented. The contents of the vessel were then poured into water as in Example I and the precipitate which formed was separated by filtration. The precipitate was dissolved in ether and the resultant ether solution dried over anhydrous sodium sulfate. The ether was then allowed to evaporate, leaving 4.4 parts of dark brown crystals. Infrared analyses showed the dark brown crystals to be 87 percent 2,6-di-tert-butyl-para-benzoquinone, a yield of 69.6 percent.

EXAMPLE III

To a reaction vessel as described in Example I was charged:

| | Parts |
|---|---|
| 2,6-di-tert-butyl-4-nitrosophenol | 5.88 |
| Manganese naphthenates | 2.0 |
| Cyclohexanone | 0.25 |
| Acetic acid | 52.5 |

The vessel was then sealed, heated and pressurized with oxygen in the same manner as in Example II. Following a four hour reaction period, the vessel was cooled, vented, and the contents discharged into 150 parts of water. Steam distillation yielded 3.6 parts of orange crystals, which was identified by its melting point of 61–68° C. as 2,6-di-tert-butyl-para-benzoquinone. The yield was 65.5 percent.

EXAMPLE IV

To a pressure reaction vessel as described in Example I was charged:

| | Parts |
|---|---|
| 2,6-di-tert-butyl-4-nitrosophenol | 5.88 |
| Basic ferric acetate | 0.48 |
| Cyclohexanone | 0.25 |
| Acetic acid | 52.5 |

The vessel was then heated to 104° C. and pressurized to 200 p.s.i.g. with oxygen. Following a four hour reaction period, the vessel was cooled, vented, and the product recovered as in Example III. The yield was 3.4 parts (M.P. 61–67°) of 2,6-di-tert-butyl-para-benzoquinone, obtained in 62 percent yield.

EXAMPLE V

To a pressure reaction vessel as described in Example I was charged:

| | Parts |
|---|---|
| 2,6-di-tert-butyl-4-nitrosophenyl | 2.94 |
| Cyclohexanone | 0.12 |
| Copper naphthenates (8 percent copper) | 1.0 |
| Acetic acid | 25 |

The vessel was sealed and heated to 105° C. Using air, the vessel was pressurized to 200 p.s.i.g. Following a four hour reaction period, the vessel was cooled and vented. The vessel contents were poured into 100 parts of water and 2.32 parts of product was recovered by steam distillation of the aqueous mixture. The product was identified by its melting point as 2,6-di-tert-butyl-para-benzoquinone, which was obtained in 84.3 percent yield.

EXAMPLE VI

To the reaction vessel described in Example I was charged:

| | Parts |
|---|---|
| 2,6-di-tert-butyl-4-nitrosophenol | 2.94 |
| Cyclohexanone | 0.12 |
| Cupric acetate monohydrate | 0.25 |
| Acetic acid | 25 |

The reaction vessel was heated to 105° C. and pressurized to 200 p.s.i.g. with air. Following a four hour reaction period, the reaction vessel was cooled, vented, and the contents poured into 75 parts of water. Steam distillation of the resultaint aqueous mixture yielded 2.19 parts (80.5 percent yield) of 2,6-di-tert-butyl-para-benzoquinone.

EXAMPLE VII

To a pressure reaction vessel as described in Example I is charged:

| | Parts |
|---|---|
| 2-nitroso-4,6-di-tert-butylphenol | 235 |
| Molybdenum dioxide | 1.3 |
| Toluene | 300 |

The reaction vessel is sealed and heated to 100° C. The pressure in the reaction vessel is increased to 1000 p.s.i.g. with air. The reaction mass is agitated for five hours while maintaining the temperature at 100° C. After this reaction period, the vessel is cooled and vented. Using the recovery procedure described in Example I, 2,4-di-tert-butyl-o-benzoquinone is recovered.

Good results are obtained when other ortho nitrosophenols are used in the above example. For example, the use of 2-nitroso-6-tert-butylphenol results in the formation of 2-tert-butyl-o-benzoquinone. The use of 2-nitroso-4,6-di-isopropylphenol leads to the formation of 2,4-di-isopropyl-o-benzoquinone. When ortho nitrosophenol is used, ortho-benzoquinone is produced in good yield. The use of 2-nitroso-4-dodecylphenol results in the formation of 2-sec-dodecyl-o-benzoquinone.

EXAMPLE VIII

To the reaction vessel described in Example I is charged:

| | Parts |
|---|---|
| 2-nitroso-4,6-dichlorophenol | 192 |
| Toluene | 300 |
| Cuprous chloride | 2.0 |
| Pyridine | 6.4 |

The reaction vessel is sealed and heated to 110° C. The internal vessel pressure is then increased to 250 p.s.i.g. with air. The reaction mixture is maintained at 110° C. and 250 p.s.i.g. air pressure over an eight hour period. Following this reaction period, the vessel is cooled, vented, and the product recovered as in Example I. 2,4-di-chloro-o-benzoquinone is obtained.

Good results are obtained when other substituted ortho nitrosophenols are employed as starting materials in the above reaction. For example, 2-nitroso-4,6-dibromophenol forms, 2,4-dibromo-o-benzoquinone. The use of 2-nitroso-4-iodophenol results in the formation of 3-iodo-benzoquinone. When 2-nitroso-4-methoxyphenol is employed as a starting material, 3-methoxy-o-benzoquinone is obtained. The use of 2-nitroso-4,6-dinitrophenol results in the formation of 2,4-dinitro-o-benzoquinone.

EXAMPLE IX

To a reaction vessel, equipped with thermometer, agitator, reflux condenser and a gas inlet tube, is added:

| | Parts |
|---|---|
| 2-isopropyl-4-nitrosophenol | 179 |
| Mixed petroleum fraction (B.P. 130° C., 60 volume percent aromatics, 40 volume percent aliphatics) | 500 |
| Nickel naphthenates | 5 |
| Cyclohexanone | 2 |

While agitating the reaction mixture, the temperature of the reaction mass is raised to 120° C. and oxygen is passed into the liquid phase at a rate approximately sufficient to deliver the volume equivalent to that of the liquid reactants every five minutes. The unreacted oxygen passes out through the reflux condenser, which condenses any escaping hydrocarbon vapor and returns it to the reaction mass. The reaction is conducted essentially at atmospheric pressure. After a reaction period of twelve hours at 120° C., the product, 2-isopropyl-para-benzoquinone, is recovered in the same manner as described in Example I.

Good results are obtained in the above example when a gram molecular equivalent of vanadium pentoxide, chromium trioxide, platinum chloride or palladium nitrate is used as oxidation catalysts in place of nickel naphthenate.

EXAMPLE X

To the reaction vessel described in Example I is charged:

| | Parts |
|---|---|
| 2-tert-butyl-4-nitrosophenol | 179 |
| Toluene | 300 |
| Cobaltous acetate tetrahydrate | 5 |
| Methyl ethyl ketone | 1 |

The vessel is sealed and heated to 105° C. Using air, the vessel pressure is raised to 200 p.s.i.g. Following a four hour reaction period, the vessel is cooled, vented, and the product recovered as in Example I. 2-tert-butyl-para-benzoquinone is obtained in good yield.

Another important embodiment of this invention is a process for producing a hydroquinone, which comprises reacting a nitrosophenol with oxygen in contact with an oxidation catalyst to produce a benzoquinone, and subsequently reducing the benzoquinone thereby produced to the corresponding hydroquinone.

The preferred nitosophenols, oxidizing catalysts and oxidation reaction conditions employed in this embodiment of the present invention are the same as those previously set forth.

The benzoquinone need not be purified before carrying out the reduction step. However, in general, it is preferred to isolate and purify the benzoquinone prior to the reduction step because it is usually easier to purify the benzoquinone than the hydroquinone.

The reduction step may be carried out with chemical reducing means. Thus, a metal in combination with an acid can be used to effect the desired reduction. Metals that will react with acids to form hydrogen are employed. Typical metals of this type are zinc, iron, magnesium, aluminum, calcium, manganese, cadmium, and the like. The most preferred metals are zinc and iron.

The acids that can be used in the redutcion step have sufficient acidity to react with the metal employed. Preferred acids are the mineral acids such as hydrochloric, sulphuric, orthophosphoric, and the like. The most preferred acid is hydrochloric acid. When hydrochloric acid is employed in the reducing step, excellent yields of hydroquinone are obtained at comparatively low cost.

Other chemical reducing means may be employed in this process. Thus, sodium aluminum hydride, sodium hydride, sodium borohydride, and the like, can be employed. These chemicals are not preferred because they are comparatively expensive.

An especially preferred reducing means that can be used in this process is catalytic hydrogenation. In this embodiment the benzoquinone is usually dissolved in an inert solvent and contacted with hydrogen and a hydrogenation catalyst. In conducting this reduction, any of the solvents utilized in the oxidation step of this process may be employed. The preferred solvents useful in the reduction step of this process are alcohols such as methanol, ethanol, propanol and isopropanol; aromatic hydrocarbons such as benzene, toluene, xylene, and mixtures thereof; and aliphatic hydrocarbons such as pentane, hexanes, heptanes, octanes, nonanes and decanes. The more preferred solvents used in the reduction step of this process are aliphatic hydrocarbons. Aliphatic hydrocarbons containing from about 6 to about 10 carbon atoms are highly preferred. When these hydocarbons are employed, the reaction proceeds smoothly and, in many instances, the hydroquinone product is readily crystallized from the solvent.

Suitable hydrogenation catalysts are those commonly used in the art to catalyze the hydrogenation of organic compounds. Some examples of these include palladium chloride on charcoal, activated nickel, nickel-nickel oxide, platinum-platinum oxide, platinum on charcoal, copper chromite, Raney nickel, palladium, platinum black, palladium sponge, nickel, copper impregnated alumina, palladium black, activated alumina, Raney copper, chromium, vanadium, molybdenum, and the like. The more preferred catalysts used in the reduction step are platinum, palladium, Raney nickel, copper impregnated alumina and copper chromite. The most preferred hydrogenation catalysts used in the reduction step of this embodiment of the present invention is Raney nickel.

The catalytic hydrogenation may be carried out at atmospheric pressure or at elevated pressures. Higher pressures usually result in faster hydrogenation rates. Extremely high pressures are not required because the benzoquinones produced in the oxidation step of the present invention are readily reduced. A preferred hydrogenation pressure range is from atmospheric pressure to about 1000 p.s.i.g. A more preferred pressure range is from about 10 to 500 p.s.i.g. A most preferred hydrogenation pressure range is from about 15 to about 100 p.s.i.g.

The hydrogenation is carried out at a temperature high enough to promote the reduction of the benzoquinone, but not so high as to cause degradation of the reactants, reaction medium or products. A preferred temperature range is from about 25° to 150° C. A more preferred temperature range is from about 40° to about 100° C., and a most preferred temperature range is from about 60° to about 80° C.

The reaction time required to convert various benzoquinones to hydroquinones will vary according to the reduction conditions employed and the particular benzoquinone being reduced. Higher temperatures usually promote faster reductions. Furthermore, higher hydrogen pressures usually afford faster reduction rates. In general, the reduction is usually complete in less than eight hours. A more preferred reaction time is from about 0.5 to 4 hours, and a most preferred reaction time is from about 0.5 to 1 hour.

The following examples combined with the previous examples serve to illustrate the embodiments of the present invention directed to a process for producing hydroquinones. All parts are parts by weight unless otherwise indicated.

EXAMPLE XI

To a reaction vessel, equipped with stirring means and temperature measuring means, was added a solution of 13.2 parts of 2,6-di-tert-butyl-benzoquinone, as prepared in Example I, in 44 parts of isopropanol. To this was added 16 parts of zinc dust. Following this, 25 parts of concentrated hydrochloric acid (37 percent) was added dropwise over a 13 minute period. An exothermic reaction caused the temperature to rise to 70° C. This was accompanied by a color change of yellow to red to colorless with some evolution of gas. The reaction was cooled to room temperature, whereupon a white precipitate separated. Twenty-nine parts of isopropanol were added to dissolve the precipitate. The mixture was then filtered to remove the excess zinc and the filtrate added to ice water. Fine white needles precipitated which were collected, dried and identified as 2,6-di-tert-butyl-hydroquinone by its melting point of 114–116° C.

In like manner, other benzoquinones can be reduced by following the procedure of the above example. The use of parabenzoquinone obtained from the oxidation of para-nitrosophenol results in para-hydroquinone. The use of o-isopropyl-para-benzoquinone obtained from the oxidation of 2-isopropyl-4-nitrosophenol results in the formation of o-isopropyl-para-hydroquinone. Likewise, when 2-tert-butyl-para-benzoquinone obtained from the oxidation of 2-tert-butyl-4-nitrosophenol is employed, o-tert-butyl-para-hydroquinone is obtained. In like manner, when 2-chloro-para-benzoquinone is used, 2-chloro-para-hydroquinone is obtained. When 2,6-dichloro-para-benzoquinone is used, 2,6-dichloro-para-hydroquinone is obtained. In general, any of the benzoquinones discussed in the earlier embodiment of the present invention directed at a process for producing benzoquinones can be used.

EXAMPLE XII

To a pressure reaction vessel, equipped with stirring means, temperature measuring means and a gas inlet tube, was added 110 parts mixed octanes, 22 parts 2,6-di-tert-butyl-para-benzoquinone and 1.5 parts Raney nickel. The vessel was then sealed and flushed with nitrogen. The vessel contents were then heated to 76° C. and the vessel pressure increased to 29 p.s.i.g. with hydrogen. While maintaining these conditions, the vessel was agitated for 35 minutes. After this reaction time, no further hydrogen up-take was observed. The vessel pressure was then vented and, while still warm, the vessel contents were filtered to remove the catalyst. On cooling to room temperature, 16.7 parts of fine white needles precipitated, which were identified as 2,6-di-tert-butyl-parahydroquinone by its melting point of 114–116° C.

In like manner, other benzoquinones can be catalytically hydrogenated to yield the corresponding hydroquinones. Thus, the use of 2-tert-butyl-para-benzoquinone in the above example results in the formation of 2-tert-butyl-hydroquinone. In like manner, any of the benzoquinones disclosed in the earlier discussion of the embodiment of the present invention directed at a process for producing benzoquinones can be employed, resulting in the formation of the corresponding hydroquinone.

Having fully disclosed a process for the production of benzoquinones and a process for the production of hydroquinones and the great utility of the products derived therefrom, it is desired that the present invention be limited only within the spirit and scope of the following claims.

I claim:

1. A process for producing a benzoquinone, said process comprising reacting a mononuclear nitrosophenol with oxygen at a temperature of from about 75° C. to about 200° C. in contact with an oxidation catalyst selected from the group consisting of metal oxides and metal salts of the first, second and third transition series of the Periodic Table.

2. The process of claim 1 wherein said nitrosophenol is a para-nitrosophenol.

3. The process of claim 2 wherein said para-nitrosophenol is substituted in at least one ortho position with an alpha-branched alkyl radical containing from 3 to about 12 carbon atoms.

4. The process of claim 3 wherein said oxidation catalyst is a metal compound having the Formula $M_nX_y$, wherein M is selected from the group consisting of copper, cobalt, molybdenum, nickel, cerium, manganese, iron, vanadium, chromium, platinum and palladium; X is selected from the group consisting of the oxide anion, inorganic acid anions and organic acid anions containing from 1 to about 20 carbon atoms; and $n$ is the valence of X, and $y$ is the valence of M.

5. A process for producing 2,6-di-tert-butyl-para-benzoquinone, said process comprising reacting 2,6-di-tert-butyl-4-nitrosophenol with oxygen at a temperature of from about 75° C. to about 200° C. in contact with an oxidation catalyst having the Formula $M_nX_y$, wherein M is selected from the group consisting of copper, cobalt, molybdenum, nickel, cerium, manganese, iron, vanadian, chromium, platinum and palladium; X is selected from the group consisting of the oxide anion, inorganic acid anions and organic acid anions containing from 1 to about 20 carbon atoms; and $n$ is the valence of X, and $y$ is the valence of M.

6. A process for producing a hydroquinone, said process comprising the steps of (A) reacting a mononuclear nitrosophenol with oxygen at a temperature of from about 75° C. to about 200° C. in contact with an oxidation catalyst selected from the group consisting of metal oxides and metal salts of the first, second and third transition series of the Periodic Table to produce a benzoquinone, and (B) reacting the benzoquinone thereby produced with reducing means to produce a hydroquinone.

7. The process of claim 6 wherein said nitrosophenol is a para-nitrosophenol.

8. The process of claim 7 wherein said para-nitrosophenol is substituted in at least one ortho position with an alpha-branched alkyl radical containing 3 to 12 carbon atoms.

9. The process of claim 8 wherein said oxidation catalyst is a compound having the Formula $M_nX_y$, wherein M is selected from the group consisting of copper, cobalt, molybdenum, nickel, cerium, manganese, iron, vanadium, chromium, platinum and palladium; X is selected from the group consisting of the oxide anion, inorganic acid anions, and organic acid anions containing from 1 to about 20 carbon atoms, and $n$ is the valence of X, and $y$ is the valence of M.

10. The process of claim 9 wherein said nitrosophenol is 2,6-di-tert-butyl-4-nitrosophenol.

11. The process of claim 9 wherein said nitrosophenol is 2-tert-butyl-4-nitrosophenol.

References Cited

UNITED STATES PATENTS 3,213,114   10/1965   Braxton et al. _____ 260—625

OTHER REFERENCES

J. Chemical Society, Barnes et al. (1961), pp. 953 to 956.

LORRAINE A. WEINBERGER, *Primary Examiner.*

L. A. THAXTON, *Assistant Examiner.*

U.S. Cl. X.R.

260—621, 625